J. O. SIMMERS.
VEHICLE SEAT.
APPLICATION FILED DEC. 19, 1916.
1,234,402.
Patented July 24, 1917.
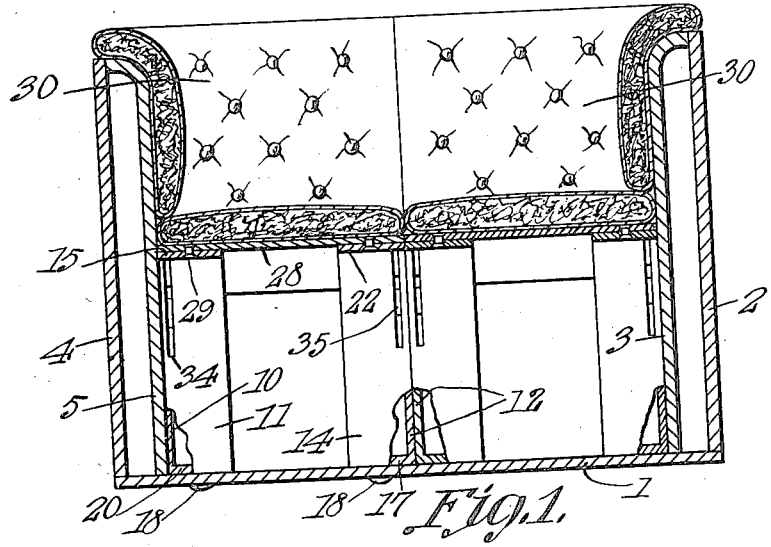
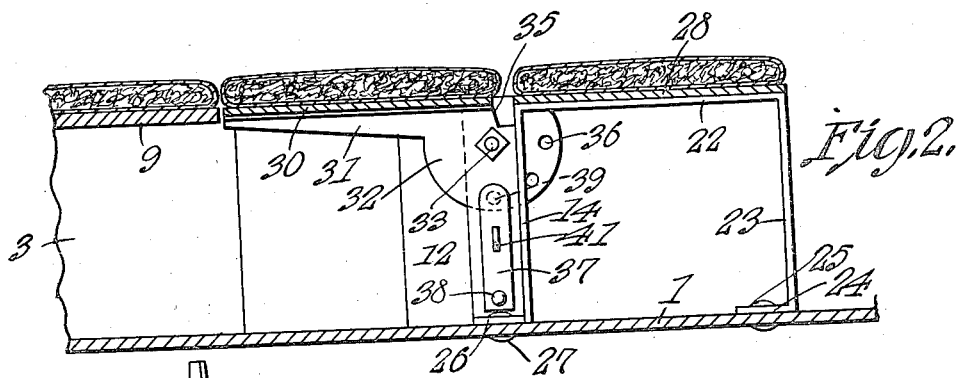
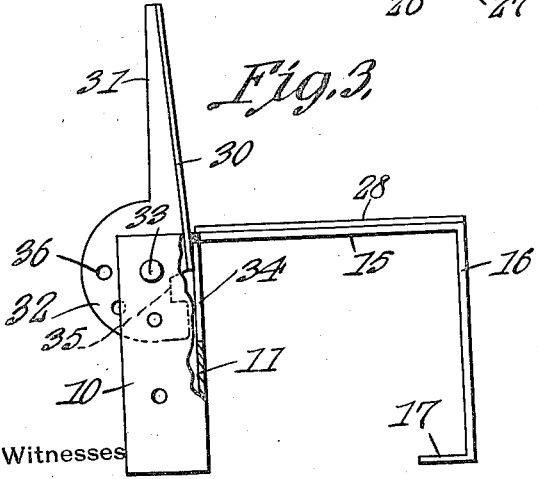
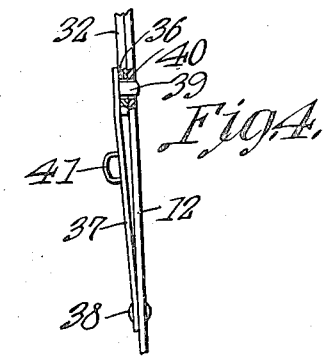
Witnesses
J. O. Simmers  Inventor
by *Attorneys*

UNITED STATES PATENT OFFICE.

JOHN OTTO SIMMERS, OF PURCELL, MISSOURI.

VEHICLE-SEAT.

1,234,402.

Specification of Letters Patent.

Patented July 24, 1917.

Application filed December 19, 1916. Serial No. 137,875.

*To all whom it may concern:*

Be it known that I, JOHN O. SIMMERS, a citizen of the United States, residing at Purcell, in the county of Jasper and State of Missouri, have invented a new and useful Vehicle-Seat, of which the following is a specification.

The device forming the subject matter of this application is a seat adapted to be used on an automobile or other vehicle, to form a bed on which a sick or wounded person may be transported, the bed being adapted for camping purposes and the like.

The invention aims to provide novel means for upholding and sustaining a portion of the front seat, and to provide novel means whereby a portion of the back of the front seat may be mounted for pivotal movement, so as to be swung down into approximate alinement with the rear seat, thereby to form a bed.

Another object of the invention is to provide novel means for holding the movable back in adjusted positions.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in cross section, an automobile constructed in accordance with the present invention, parts appearing in elevation;

Fig. 2 is a fragmental longitudinal section of an automobile embodying the seat structure hereinafter described, distant parts being omitted;

Fig. 3 is a fragmental elevation showing the seat forming the subject matter of this application, parts being broken away; and Fig. 4 is a fragmental vertical section showing the latch mechanism whereby the back of the front seat is controlled.

In the drawings, the numeral 1 indicates the floor of an automobile body, the body including an outer wall 2 and an inner wall 3. The body of the automobile includes an outer wall 4 and an inner wall 5. The rear seat of the automobile or other vehicle is shown at 9.

The device described in this application may be used in connection with automobiles and other vehicles of widely different sorts, but the vehicle construction above described may be taken as typical of one of the many structures to which the device forming the subject matter of this application may be applied.

In carrying out the present invention there is provided an angle member which preferably is made of metal. The angle member or post stands upright and includes a flange 10 extended longitudinally of the vehicle, and a flange 11 extended transversely of the vehicle. The flange 10 of the angle member is secured to the inner wall 5. The invention comprises a second angle member including a flange 12 and a flange 14. The flange 12 extends longitudinally of the vehicle, whereas the flange 14 extends crosswise of the vehicle. The cross flange 11 is extended forwardly to form a horizontal support 15. The support 15 is prolonged downwardly to form a leg 16 terminated in a rearwardly extended foot 17 resting on the bottom 1 and secured thereto as shown at 18. The flange 10 at its lower end may be provided with a horizontal foot 20, projecting toward the longitudinal center of the vehicle and resting on the bottom or floor 1, the foot 20 being secured to the bottom or floor 1 of the vehicle. The cross flange 14 is extended at its upper end to form a horizontal support 22 terminating in a depending leg 23 provided at its lower end with a rearwardly extended foot 24 resting on the bottom or floor 1 and secured thereto as shown at 25. The flange 12 has a horizontal foot 26 which projects laterally and rests on the floor 1, the foot 26 being secured to the floor as shown at 27. A seat 28 is upheld by the supports 22 and 15, the seat 28 being secured to the supports as shown at 29.

The numeral 30 designates a vertically swinging back, coöperating with the seat 28. On its rear face, the back 30 is provided with longitudinal ribs 31 terminating in enlarged semi-circular heads 32. The heads 32 lie inside of the flanges 12 and 10 and are secured thereto by pivot elements 33. The flanges 11 and 14 are provided with slots 34 through which the heads 32 project. The heads 32 are provided in their upper edges with notches 35 which, coöperating with the flanges 11 and 14 at the upper ends of the slots 34, serve to limit the downward and rearward swinging movement of the back 30. In the heads 32, openings 36 are formed.

Attached to the flanges 12 and 10 are resilient latches 37, any suitable means indicated at 38 being used to secure the lower ends of the latches 37 to the said flanges. The latches 37 are provided with studs 39 which pass through the holes 36 in the heads 32, and enter openings 40 formed in the flanges 12 and 10. The latches 37 are provided with handles 41.

In practical operation, the back 30 may be swung upwardly, under which circumstances, the front seat may be used in the ordinary manner. The studs 39 engage certain of the openings 36 to hold the back 30 in the upstanding position shown in Fig. 1.

When it is desired to form a bed, the handles 41 are grasped, and the tongues 37 are pulled inwardly toward each other, thereby disengaging the studs 39 from the holes 36 in the heads 32. Thereupon, the back 30 may be swung downwardly into the horizontal position shown in Fig. 2, the pivot elements 33 permitting the operation above mentioned. After the back 30 has been lowered into the position of Fig. 2, the studs 39, under the action of the spring tongues or latches 37 will ride into one set of openings 36 in the heads 32, and hold the back 30 in the position shown in Fig. 2.

The structure above described is duplicated at each side of the vehicle, and either of the backs 30 may be manipulated independently of the other.

Having thus described the invention, what is claimed is:—

In a device of the class described, a vehicle body; posts including side flanges secured to the body, and flanges extended transversely of the body, the transverse flanges being provided with slots, the transverse flanges being forwardly prolonged to form supports, and the supports being downwardly extended to form legs coacting with the vehicle body; a seat carried by the supports; pivot elements carried by the side flanges of the posts; a vertically swinging back coöperating with the seat; heads carried by the back and movable in the slots, the heads being mounted on the pivot elements; and latches carried by the side flanges and coacting with the heads to hold the back in adjusted positions with respect to the vertical.

In testimony that I claim the foregoing as my own, I have hereto affixed my signature in the presence of two witnesses.

JOHN OTTO SIMMERS.

Witnesses:
C. V. ROWE,
L. C. KILMER.